United States Patent [19]
Angel

[11] 4,413,761
[45] Nov. 8, 1983

[54] SUPPORT APPARATUS FOR MOTOR VEHICLE BUMPER RACK MEMBERS

[76] Inventor: Norman Angel, 2321 Carolton Rd., Maitland, Fla. 32751

[21] Appl. No.: 386,601

[22] Filed: Jun. 9, 1982

Related U.S. Application Data

[63] Continuation-in-part of Ser. No. 298,340, Aug. 31, 1981, abandoned.

[51] Int. Cl.³ ............... B65R 9/06; A47F 5/00; B60R 19/02
[52] U.S. Cl. ............ 224/42.45 R; 224/42.03 R; 224/42.44; 211/86; 280/769; 293/117
[58] Field of Search ............... 224/42.08, 42.04, 42.21, 224/42.43, 42.44, 42.45 R, 321, 42.07, 42.03 R, 42.03 A, 42.03 B, 42.06; 293/117; 280/769; 248/94, 293, 205.1, 291, 207, 674; 211/86; 16/277, 333, 335

[56] References Cited

U.S. PATENT DOCUMENTS

| | | | |
|---|---|---|---|
| 870,038 | 11/1907 | Knapp . | |
| 984,225 | 2/1911 | Knapp . | |
| 1,487,974 | 3/1924 | Prouty . | |
| 2,027,852 | 1/1936 | Allan | 224/42.03 R |
| 2,653,002 | 9/1953 | Passman | 248/291 |
| 2,946,881 | 7/1960 | Pascucci | 248/293 |
| 3,822,814 | 7/1974 | Baldi | 224/42.06 |
| 3,874,575 | 4/1975 | Wasserman . | |
| 3,913,811 | 10/1975 | Spencer | 224/42.08 |
| 4,056,250 | 11/1977 | Uchiyama | 248/674 |
| 4,085,874 | 4/1978 | Graber . | |
| 4,146,204 | 3/1979 | Thalenfeld . | |

FOREIGN PATENT DOCUMENTS

| | | | |
|---|---|---|---|
| 2758582 | 7/1979 | Fed. Rep. of Germany | 248/293 |
| 1086166 | 2/1955 | France | 224/42.08 |

OTHER PUBLICATIONS

Publication entitled "Road-Rack", (date unknown).

*Primary Examiner*—Allan N. Shoap
*Assistant Examiner*—Robert Petrik
*Attorney, Agent, or Firm*—Buell, Blenko, Ziesenheim & Beck

[57] ABSTRACT

A vertical back plate member is provided for mounting to a bumper. A pair of parallel side members extend from the back plate. A partition member joins the side members and forms a socket area with the back plate and side members to receive and position a bumper rack member in a vertical position. A strut member joins the side members near front edges of the side members and is positioned below a bottom edge of the partition member such a distance so as to permit a bumper rack member to be inserted between the bottom edge of the partition member and the strut member. Each side member has aligned first holes between the bottom edge of the partition member and the strut member to receive a pin which passes through a rack member to prevent horizontal movement of the rack member and to serve as a pivot point for movement of the rack member from a horizontal position to a vertical position. Each side member also having aligned second holes slightly above the bottom edge of the partition member to receive a pin across a top surface of a horizontal rack member to prevent vertical movement of the rack member when it is in a horizontal position and to maintain the rack member in position when it is in the vertical position.

9 Claims, 10 Drawing Figures

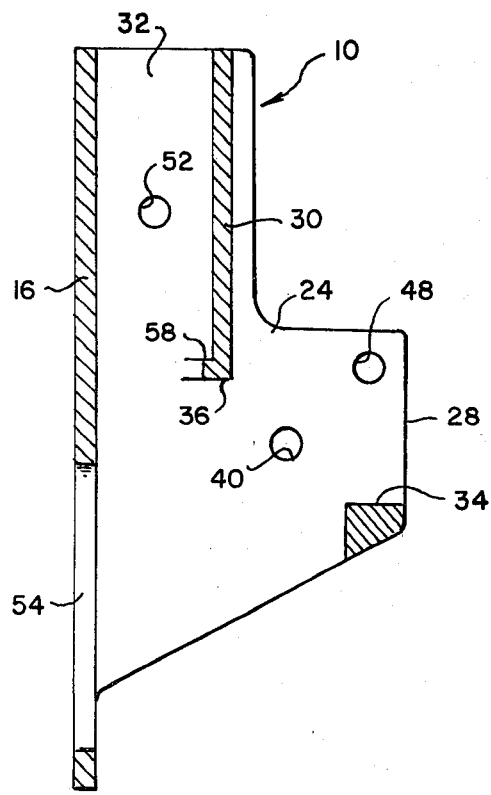
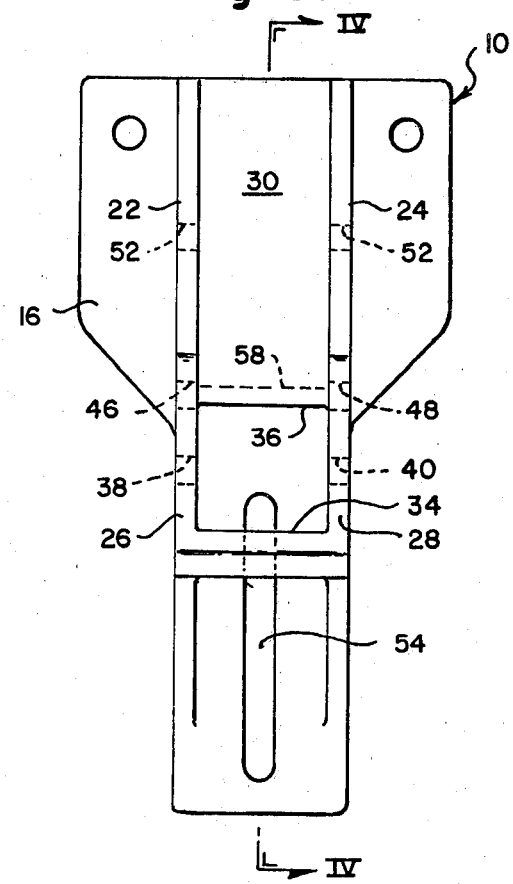
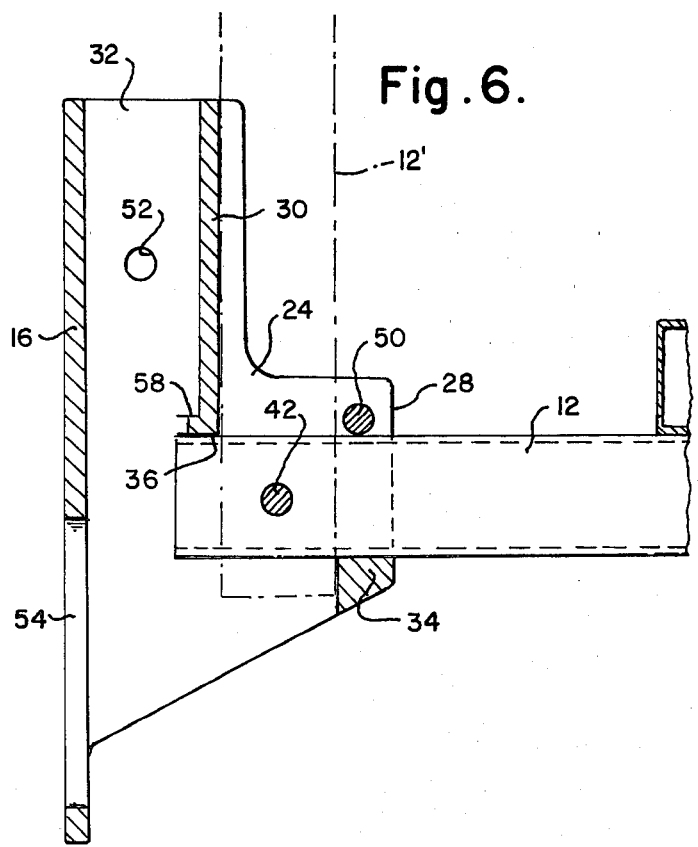
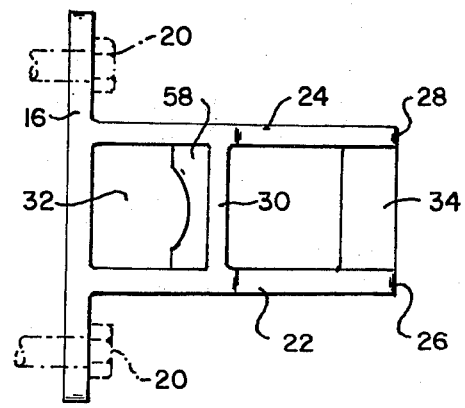

SUPPORT APPARATUS FOR MOTOR VEHICLE BUMPER RACK MEMBERS

This application is a continuation-in-part of my copending application Ser. No. 298,340, filed Aug. 31, 1981, now abandoned.

The invention relates to an apparatus for supporting and maintaining a motor vehicle tailgate rack assembly.

PROBLEM

Small and compact cars have reduced the amount of traditional trunk storage space. As a result vehicles are carrying some of their cargo load on the outside portion of the vehicle.

Devices heretofore have included racks such as that shown in U.S. Pat. Nos. 4,085,874 and 1,487,974. These devices show support devices which are cumbersome and cannot be quickly assembled. My device is a support apparatus which can be permanently mounted on a vehicle bumper to receive a tailgate type rack assembly (bumper rack assembly). The support apparatus is versatile because the rack can be positioned in a horizontal position, a vertical position or be removed for storage. The rack assembly can be quickly and easily removed from the support apparatus. When the rack is in the horizontal position or vertical position a cable can be connected to the rack assembly from the trunk for additional support.

THE INVENTOR'S SOLUTION

I provide a support apparatus which when used in pairs and attached suitably to a motor vehicle bumper will support a tubular rack assembly in a horizontal or vertical position. The free ends of the rack members can be tied by wires (cable) to the trunk of the vehicle.

I provide a support apparatus for motor vehicle bumper rack members comprising: a vertical back plate member for joining to the bumper; a pair of parallel spaced apart side members perpendicularly joined to the back plate, each having a front edge; a partition member means perpendicularly joining the side members, spaced in parallel from the back plate and having a bottom edge and forming a socket area with the back plate and the side members to receive and position a bumper rack member in a vertical position; a strut member joining the side members near the front edge of the side members, the strut member is positioned below the bottom edge of the partition member means a sufficient distance to permit a bumper rack member to be inserted between the bottom edge of the partition member means and the strut member, each side member having aligned first holes between the bottom edge of the partition member means and the strut member to receive a pin which passes through a rack member to prevent horizontal movement of the rack member and to serve as a pivot point for movement of the rack member from a horizontal position to a vertical position; and each side member having aligned second holes slightly above the bottom edge of the partition member means to receive a pin across a top surface of a horizontal rack member to prevent vertical movement of the rack member when it is in a horizontal position and to maintain the rack member when it is placed in a vertical position.

DRAWINGS

In the accompanying drawings, I have shown a present preferred embodiment of the invention in which:

FIG. 3 is a front elevational view of FIG. 1;

FIG. 4 is a sectional view taken on the line IV—IV;

FIG. 5 is a top plan view of FIGS. 1 and 3,

FIG. 6 is the same in FIG. 4 showing a rack member in solid line in the horizontal position and in chain line moved to its vertical position;

DETAILED DESCRIPTION

Figure 1:
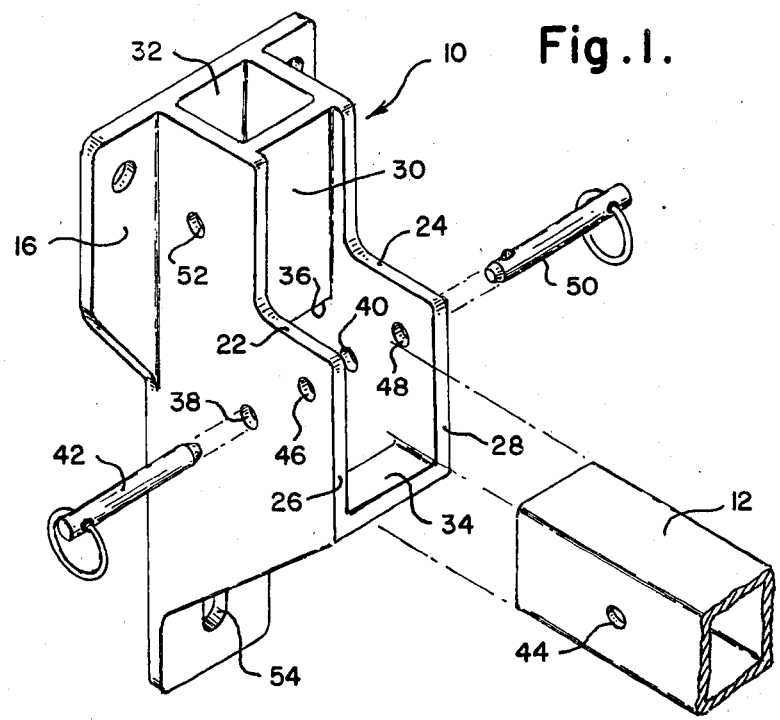
FIG. 1 is a perspective view of the support apparatus for motor vehicle bumper rack members.
Figure 2:
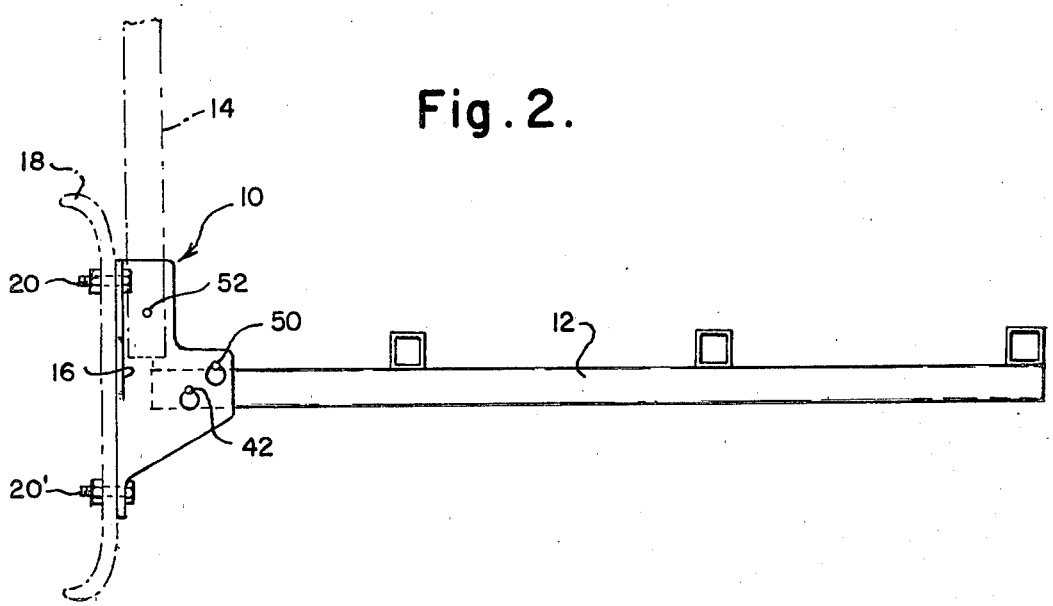
FIG. 2 is a side elevational view showing the apparatus attached to a bumper in chain line in FIG. 1 including a motor vehicle bumper rack member in a horizontal position and a partial view of an additional rack member in chain line inserted into a socket of the support apparatus.

Referring to the Figures a support apparatus (FIG. 1) generally 10 for motor vehicle bumper rack members 12, 12' and 14 has a vertical back plate member 16 for joining to a bumper 18 of an automobile by any suitable means. FIG. 2 shows the plate member 16 joined to the bumper 18 by bolts and nuts 20 and 20'. The plate 16 can also be joined by bolts to a plate not shown which sandwiches the bumper 18 with the back plate 16 which can straddle the bumper 18 above and below permitting a clamping effect by bolts passing above the bumper and below it joining the two plates. A pair of parallel spaced apart side members 22 and 24 are perpendicularly joined to the back plate 16. Each side member 22 and 24 has a front edge 26 and 28 respectively. A partition member 30 perpendicularly joins the side members 22 and 24 and forms a socket area 32 with the back plate 16 and the side members 22 and 24. A strut member 34 joins the side members 22 and 24 near their front edges 26 and 28 and is positioned below a bottom edge corner 36 of the partition member 30 a distance to permit the bumper rack member 12 to be inserted between the bottom edge corner 36 of the partition member 30 and the strut member 34.

Each side member 22 and 24 has aligned holes 38 and 40 between the bottom edge corner 36 of the partition member 30 and the strut 34 to receive a pin 42 which passes through hole 44 in rack 12 to prevent horizontal movement of the rack 12. The pin 42 also serves as a pivot point for movement of the rack member 12 from a horizontal position to a vertical position 12' as shown in FIG. 6. Each side member 22 and 24 has aligned holes 46 and 48 slightly above the bottom edge corner 36 of the partition member 30 to receive a pin 50 across the top surface of the rack member 12 to prevent vertical movement of the rack when it is in the horizontal position and to retain it in the vertical position shown in chain line 12' in FIG. 6 when the rack 12 is moved to the vertical position. The support apparatus 10 has a socket area 32 into which a rack member 14 may be inserted. This rack will rest on top of a horizontal seat 58 which extends from the partition 30 at edge corner 36 towards the back plate 16 and it may also be supported by a pin through hole 52. To facilitate adjustment of the back plate member 16 with the bumper 18

(or another plate not shown) slot 54 is provided to make the plate 16 vertically adjustable when using a bolt.

In operation two supports 10 are mounted on a motor vehicle bumper 18 (or with another plate sandwiching the bumper 18 with the plate 16) and then a pair of rack members 12 are inserted horizontally. The rack members 12 have cross members to hold any given load. To store the rack in a vertical position when it is not in use or to carry a vertical load pin 50 can be pulled and the rack assembly can pivot about pin 42 and pin 50 can be reinserted to hold the rack assembly in the vertical position.

Also whenever the rack assembly is in the horizontal position an additional rack member 14 can be inserted into socket 32. These additional rack members 14 can be used simultaneously with rack members 12 when unusual loads are used.

Figure 7:
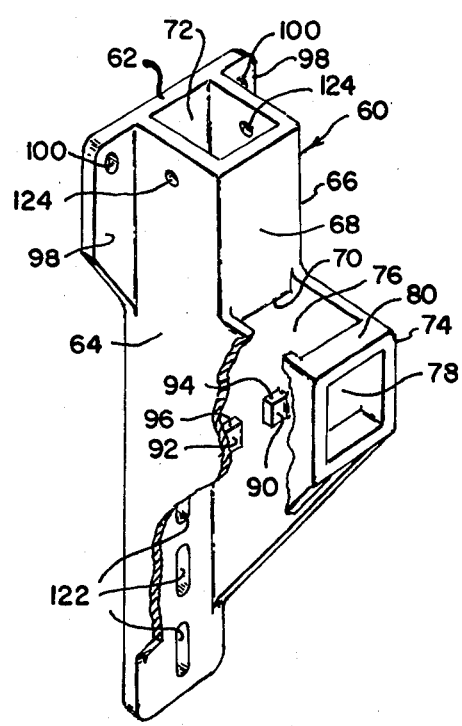
FIG. 7 is a cutaway perspective view of another embodiment of a support apparatus for motor vehicle bumper rack member.
Figure 8:
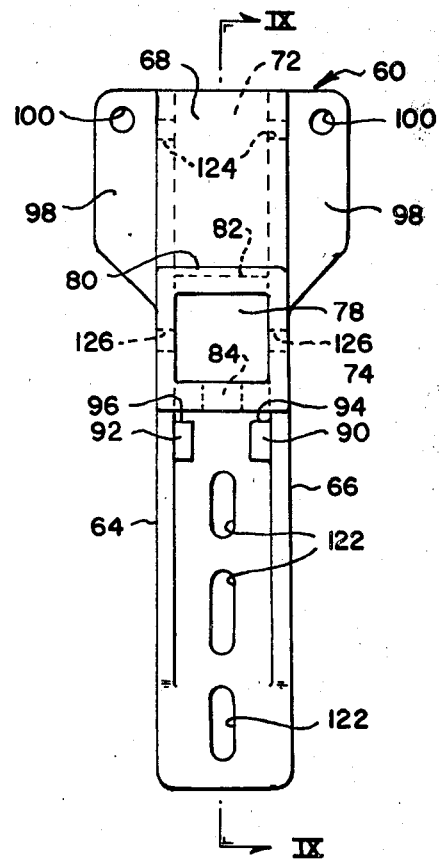
FIG. 8 is a front elevational view of FIG. 7.
Figure 9:
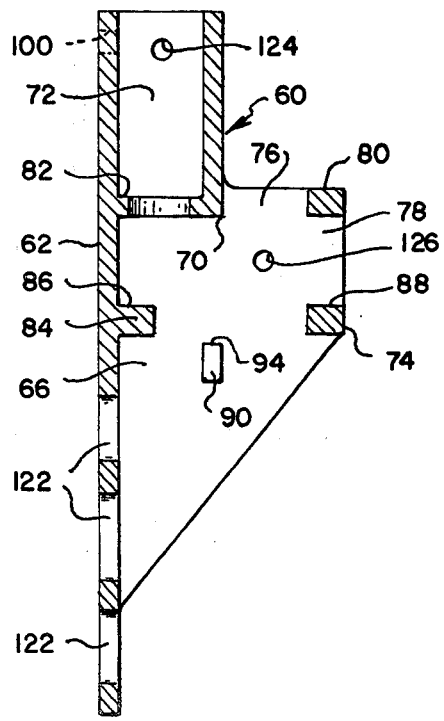
FIG. 9 is a vertical sectional view taken on line IX—IX of FIG. 8.
Figure 10:
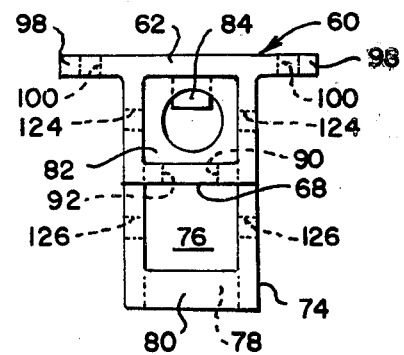
FIG. 10 is a top plan view of FIG. 7.

Another embodiment of the support apparatus is shown in FIGS. 7 through 10 and generally as 60 in FIG. 7. The figures show a vertical back plate member 62 and a pair of parallel spaced apart side members 64 and 66 which are perpendicularly joined to the back plate 62. A partition member 68 perpendicularly joins the side members 64 and 66 and is spaced in parallel from the back plate 62 and has a bottom portion 70 and forms a socket area 72 with the back plate 62 and the side members 64 and 66 to receive and position a rack member in a vertical position (not shown but similar to that shown as 14 in FIG. 2).

A socket member 74 extends horizontally and perpendicularly from the partition member 68 and has a vertical socket opening 76 to receive a rack member (not shown but similar to rack member 12' shown in FIG.6) and position it vertically. The socket member 74 also has a horizontal socket opening 78 to receive a rack member (not shown but similar to rack member 12 shown in FIG. 6) and position it horizontally. The socket member 74 has a top surface 80 which extends from a point near the bottom portion 70 of the partition member 68.

A seat member 82 is positioned within the socket area 72 formed by the partition member 68 side members 64 and 66 and back plate member 62. The seat 82 is positioned near the bottom portion 70 of the partition member 68.

A first projecting stop means 84 extends perpendicularly from the back plate 62 and has a top surface 86 which is aligned with a top surface 88 of a bottom portion of the horizontal socket opening 78.

A pair of second projecting stop means 90 and 92 extend from inside surfaces of the side members 64 and 66. The pair of second projecting stop means 90 and 92 have top surfaces 94 and 96 which are either aligned or below the top surface 86 of the first projecting stop means 84.

A rack member can be inserted into socket area 72, vertical socket opening 76 or horizontal socket opening 78. A rack member rests upon seat 82 when the socket area 72 is used. Simultaneously, horizontal socket opening 78 may be used to receive a rack member which when not in the horizontal position can be stored in a vertical position using the vertical opening 76. A pair of aligned holes 124 in th side members 64 and 66 receive a pin (not shown) which can pass through a vertical rack member and retain it against vertical movement. Also a pair of aligned holes 126 in the sides of socket member 74 receive a pin (not shown) which passes through either a vertical rack member (not shown) or a horizontal rack member (not shown).

The back plate member 62 has a pair of flanges 98 each with a hole 100 to receive bolts for mounting to a bumper. A plurality of slots 122 are located below the socket member 74 to receive bolts for mounting to a bumper. The number of slots permit adjustment flexability.

I claim:

1. A support apparatus for motor vehicle bumper rack members comprising:
   (a) a vertical back plate member for joining to the bumper;
   (b) a pair of parallel spaced apart side members perpendicularly joined to the back plate, each having a front edge;
   (c) a partition member means perpendicularly joining the side members, spaced in parallel from the back plate and having a bottom edge and forming a socket area with the back plate and the side members to receive and position a bumper rack member in a vertical position; and
   (d) a strut member joining the side members near the front edge of the side members, the strut member is positioned below the bottom edge of the partition member means a distance to permit a bumper rack member to be inserted between the bottom edge of the partition member means and the strut member, each side member having aligned first holes between the bottom edge of the partition member means and the strut member to receive a pin which passes through a rack member to prevent horizontal movement of the rack member and to serve as a pivot point for movement of the rack member from a horizontal position to a vertical position and each side member having aligned second holes slightly above the bottom edge of the partition member means to receive a pin across a top surface of a horizontal rack member to prevent vertical movement of the rack member when it is in a horizontal position and to maintain the rack member when it is placed in a vertical position.

2. The support as recited in claim 1 wherein the back plate has a vertical slot to receive a bolt for fastening the back plate to the bumper.

3. The support as recited in claim 1 wherein each side wall has aligned third holes in the socket area to receive a pin through the rack member to prevent the rack member from vertical movement.

4. The support as recited in claim 1 or 3 including a horizontal seat means extending from the partition member means towards the back plate member whereby a vertical rack member inserted into the socket area can rest on the seat means.

5. A support apparatus for motor vehicle bumper rack members comprising:
   (a) a vertical back plate member for joining to the bumper;
   (b) a pair of parallel spaced apart side members perpendicularly joined to the back plate;
   (c) a partition member perpendicularly joining the side members, spaced in parallel from the back plate and having a bottom portion and forming a socket area with the back plate and the side members to receive and position a rack member in a vertical position;
   (d) a socket member extending horizontally and perpendicularly from the partition member and having a vertical socket opening to receive a rack member and position it vertically and a horizontal socket opening to receive a rack member and position it horizontally, the socket member having a top surface which extends from a point near the bottom portion of the partition member;

(e) a seat member within the socket area formed by the partition member, side members and back plate member, the seat positioned near the bottom portion of the partition member;

(f) a first projecting stop means extending perpendicularly from the vertical back plate and having a top surface which is aligned with a top surface of a bottom portion of the horizontal socket opening; and (g) at least one second projecting stop means extending from an inside surface of one side member and having a top surface not above the top surface of the first projecting stop means.

6. The support as recited in claim 5 including a pair of aligned holes in the side members to receive a pin through a vertical rack member to prevent the rack member from vertical movement.

7. The support as recited in claim 5 including a pair of aligned holes in the socket member extending from the partition member, the holes receive a pin through either a vertical rack member inserted in the vertical socket or a horizontal rack member inserted through the horizontal socket to hold the member from movement.

8. The support as recited in claim 5 including a pair of flanges integral to the vertical back plate, each flange having a hole to receive a bolt.

9. The support as recited in claim 5 including a plurality of slots located in the vertical back plate and located below the socket member.

* * * * *